Figure 1:
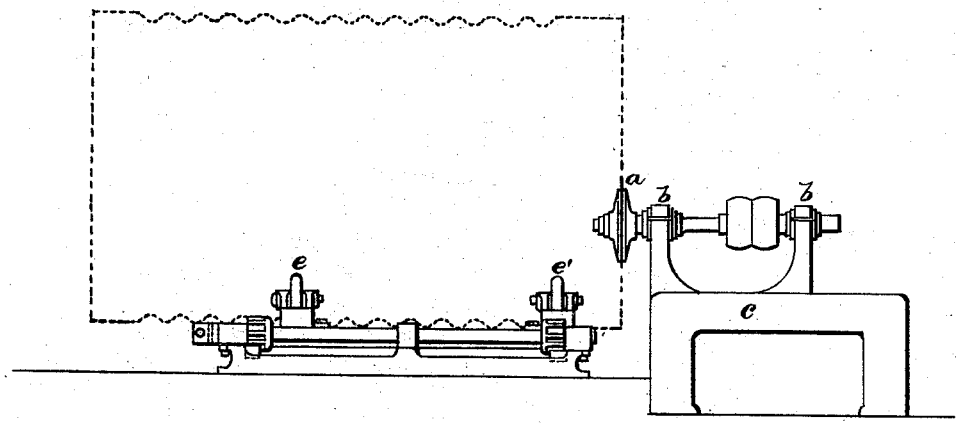
Figure 1:
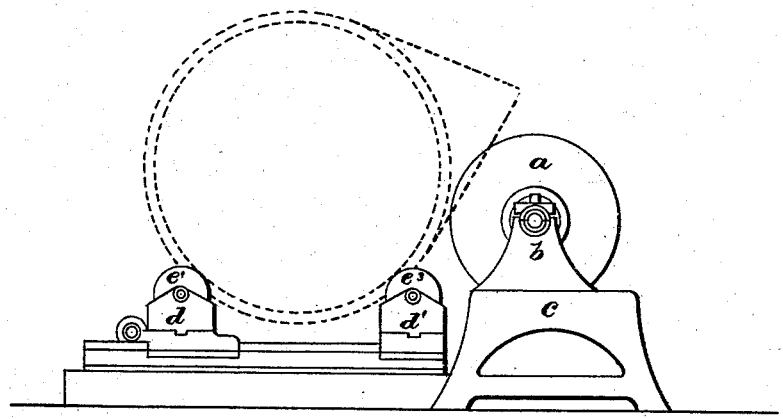

(No Model.) 2 Sheets—Sheet 1.

S. FOX.
MACHINE FOR CUTTING OFF THE ENDS OF TUBES.

No. 263,157. Patented Aug. 22, 1882.

Fig. II.

Witnesses.
Robert Everett
C. S. Hyer

Inventor.
Samson Fox.
By J. J. Coombs,
Atty.

(No Model.) 2 Sheets—Sheet 2.
S. FOX.
MACHINE FOR CUTTING OFF THE ENDS OF TUBES.
No. 263,157. Patented Aug. 22, 1882.
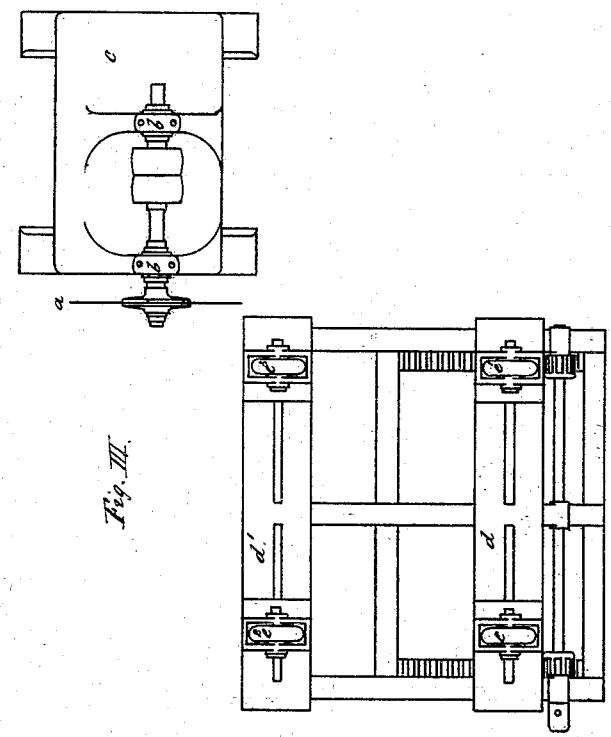
Fig. III.
Witnesses,
Vinton Coombs
Robert Everett.
Inventor:
Samson Fox.
By J. J. Coombs,
Atty.

UNITED STATES PATENT OFFICE.

SAMSON FOX, OF LEEDS, COUNTY OF YORK, ENGLAND.

MACHINE FOR CUTTING OFF THE ENDS OF TUBES.

SPECIFICATION forming part of Letters Patent No. 263,157, dated August 22, 1882.

Application filed April 5, 1882. (No model.)

*To all whom it may concern:*

Be it known that I, SAMSON FOX, a citizen of England, residing at the town of Leeds, in the county of York, England, have invented certain new and useful Improvements in Saws for Cutting Square the Ends of Corrugated Tubes; and I do hereby declare the following to be a full, clear, and exact description of the invention, such as will enable others skilled in the art to which it appertains to make and use the same.

My improved machine is for cutting true and square the ends of corrugated tubes after they have been passed through the corrugating process, so as to give a fair and sound edge to calk on.

In the accompanying drawings, Figure I is a side view, and Fig. II an end view, of my machine in elevation; and Fig. III is a plan view of the same.

I have a circular saw of steel, $a$, mounted in suitable bearings, $b$, on a stand, $c$, driven by a belt. In front of this saw I have a sliding carriage, $d$ and $d'$, fitted with four narrow round-edged rollers, $e$ $e'$ $e^2$ $e^3$, on which the corrugated tube rests, or can be made easily to revolve on by the attendants. The tube is heated all round at one end on a circular furnace, then placed on the four rollers $e$ $e'$ $e^2$ $e^3$ in front of the rapidly-revolving saw $a$. The tube, while resting on the rollers and the slide, is caused to advance by rack or screw motion up to the revolving saw $a$, and when the saw has cut its way through the material the tube is slowly revolved by hand on the rollers until the irregular edge falls away all round. This is done as easily when the end of a tube is formed with the winged bonnet to fit a combustion-chamber as it is on a plain circular-ended tube, and twenty times as quickly as they are usually done in a lathe cold.

What I claim as my invention is—

The circular saw $a$, mounted in suitable bearings on a stand, $c$, and driven by a belt or its equivalent, in combination with the sliding carriage $d$ $d'$, fitted with four narrow round-edged rollers, $e$ $e'$ $e^2$ $e^3$, on which the corrugated tube rests and may be revolved, substantially as described.

In testimony whereof I affix my signature in presence of two witnesses.

SAMSON FOX.

Witnesses:
JOSEPH HODGSON VEVERS,
HENRY SKIRROW LEUTY,
*Clerks to Messieurs Teale & Appleton, Solicitors, Leeds, England.*